United States Patent [19]
Martin, Sr.

[11] 3,954,289
[45] May 4, 1976

[54] PLENUM STARTER PIECE

[75] Inventor: Lendell Martin, Sr., Houston, Tex.

[73] Assignee: East Houston Air Conditioning, Inc., Houston, Tex.

[22] Filed: June 13, 1974

[21] Appl. No.: 478,918

[52] U.S. Cl. .............................. 285/158; 285/424
[51] Int. Cl.² ............................................. F16L 3/04
[58] Field of Search ........... 285/158, 189, 424, 399, 285/332, 56, 57, 58, 59, 60

[56] References Cited
UNITED STATES PATENTS

| | | | |
|---|---|---|---|
| 961,685 | 6/1910 | Cosgrove | 285/58 |
| 2,456,195 | 12/1948 | Jackson | 285/158 X |
| 3,095,219 | 6/1963 | Tutty | 285/158 X |
| 3,430,990 | 3/1969 | Nelson | 285/158 |

FOREIGN PATENTS OR APPLICATIONS

| | | | |
|---|---|---|---|
| 49,094 | 8/1966 | Germany | 285/158 |

*Primary Examiner*—Dave W. Arola
*Attorney, Agent, or Firm*—Joseph H. Schley; Thomas L. Cantrell

[57] ABSTRACT

Disclosed is a plenum starter piece useful for attaching conduit to a planar plenum. The starter piece includes a body member which is a relatively short cylindrical piece having an external flange adapted to fit against the surface of the plenum and to accommodate fastening means. The outer end of the body member is proportioned for telescoping engagement with a conduit. Telescoped into the flanged end of the body member is an insert having a projecting end which is proportioned to fit through and engage the edges of a hole cut in the plenum.

1 Claim, 3 Drawing Figures

PLENUM STARTER PIECE

BACKGROUND OF THE INVENTION

This invention relates to conduits and ducts for air handling equipment such as heating and air conditioning units. It is particularly concerned with a plenum starter piece.

In the heating and air conditioning field, there are many instances when it is necessary to connect a generally tubular conduit into an opening in a generally planar surface. A most typical instance is the attachment of conduit to the plenum of a furnace or air conditioner. For this reason the present invention is denominated a "plenum starter piece" although it should be understood that it may be employed to attach conduit to planar surfaces which are not parts of a plenum.

Various methods have been used in the past for attaching conduits to plenums, but one of the most common involves cutting a hole in the plenum wall which is approximately round, and installing a starter piece which consists of a short cylindrical tube having a series of outwardly bent tabs encircling one end thereof. Alternate tabs are placed on the interior of the plenum wall and the intervening tabs on the exterior of the wall. This, and other commonly employed methods have the disadvantages that installation is difficult and time consuming, the joint tends to be leaky, and the relative weakness of the joint makes it impractical to rely upon the plenum wall as a major means of support for a run of conduit.

SUMMARY OF THE INVENTION

In accordance with the present invention, a plenum starter piece is provided which is simple to manufacture, equally simple to install on a plenum, and which forms a joint which is nonleaky, and strong enough to serve as a major support point for the conduit. The plenum starter piece of the invention includes a body, which is a short generally cylindrical piece, formed of sheet metal, having an external annular flange adapted to fit against the planar surface of the plenum and to accommodate fastening means such as sheet metal screws for attaching the starter piece to the plenum. Telescoped into the flanged end of the body is a cylindrical insert. One end of the insert projects axially away from the flanged end of the body a short distance. It is proportioned to fit through and to engage the edges of a generally round hole cut in the plenum. The end of the starter piece body which is not provided with a flange is proportioned for telescoping engagement with a section of conduit.

In use, the plenum starter piece of the invention is placed adjacent a hole cut in the plenum wall with the insert portion projecting into and engaging the edges of the hole, and with the flange of the body seated against the plenum wall around the periphery of the hole. Holes are drilled in the flange and plenum wall and sheet metal screws are employed to fasten the starter piece to the plenum wall. A piece of conduit is then normally telescoped into engagement with the outer end of the starter piece.

From the foregoing it can be seen that among the objects of the invention are the provision of a plenum starter piece which is simple to manufacture, easy to install, and which forms a joint that is nonleaky and strong.

The manner in which the foregoing objects, together with other objects and purposes, is accomplished can best be understood by a consideration of the detailed description which follows, together with the accompanying drawings.

DESCRIPTION OF THE PREFERRED EMBODIMENTS

In the figures the plenum starter piece of the invention is designated generally as 10. It is a two-piece structure in its preferred form, having a body piece 11 and an insert piece 12.

Figure 1:
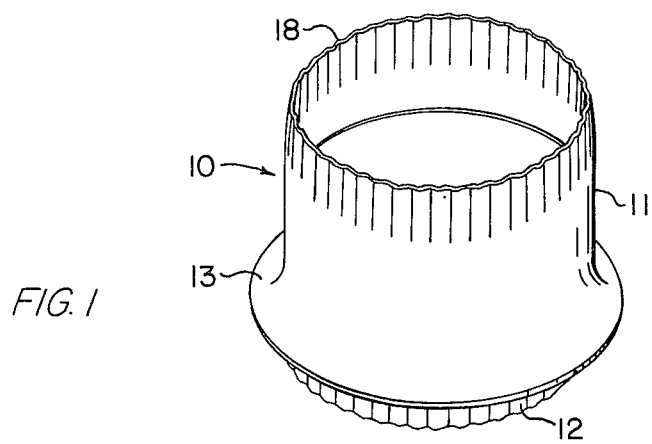
FIG. 1 is a perspective view of a plenum starter piece constructed in accordance with the invention.
Figure 2:
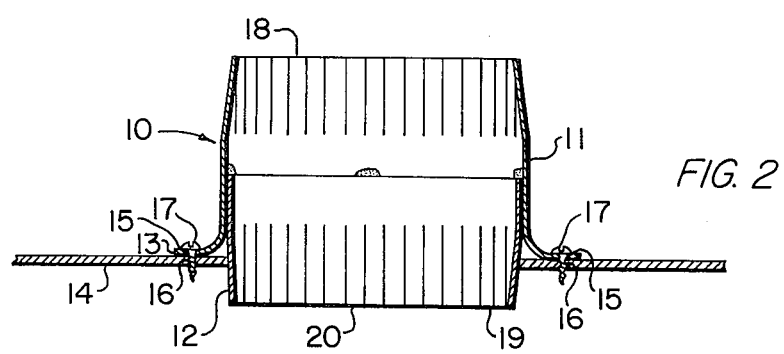
FIG. 2 is a sectional elevational view of the plenum starter piece of FIG. 1 applied to the wall of a plenum.
Figure 3:
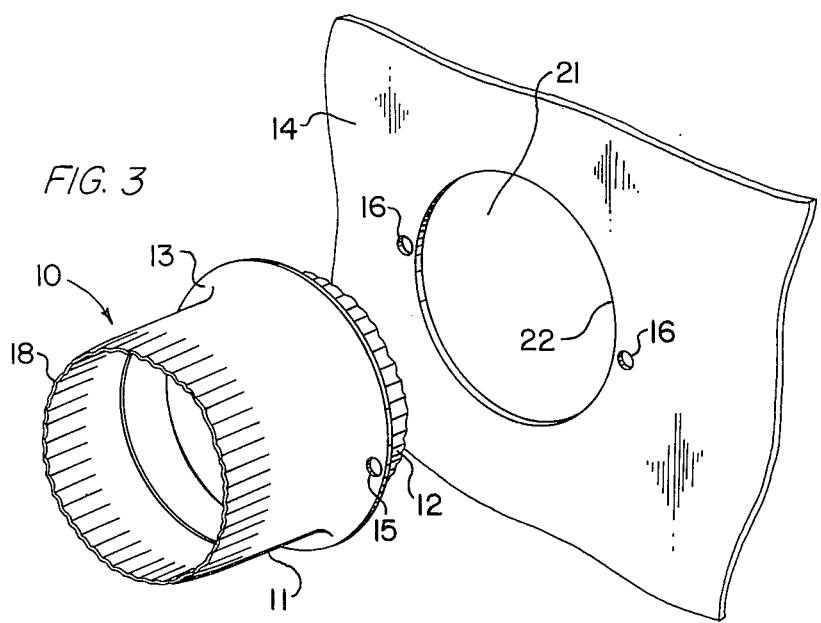
FIG. 3 is a perspective view of the plenum starter piece of the invention being brought into position for installation in a plenum wall.

The body piece 11 is a relatively short generally cylindrical member, preferably formed of sheet metal. It has at one end an integral external annular flange 13, which, as can best be seen in FIG. 2, is adapted to fit against the planar wall 14 of a plenum. When the flange 13 is so fitted against the plenum wall 14, attachment of the starter piece 10 to the plenum wall is readily effected by drilling holes 15 and 16, and driving sheet metal screws 17 through the aligned holes.

The other end of the starter piece body 11 is preferably corrugated slightly as at 18, and tapered inwardly slightly, to proportion it for telescoping engagement with a conduit piece (not shown).

The insert 12 is telescoped into the flanged end of the body 11, and the two parts are desirably attached together, as by spot welds at several locations around their peripheries. The insert 12 has an end 19 which projects away from, in an axial direction, the flanged end of body member 11. End 19 is preferably corrugated slightly as at 20, and is tapered inwardly slightly, so that when the starter piece is installed, the insert projects into and through a hole 21 which has been cut in the wall 14 of the plenum, and frictionally engages the edge 22 of the wall.

Since the starter piece not only engages the edge of the wall (through insert 12), but also engages the planar surface of the wall 14 (through flange 13), leakage of air is minimized, especially as compared to prior art starter pieces. Furthermore, this construction provides a joint between the starter piece and the plenum wall which is strong and has good resistance to bending moments which may be applied to the starter piece. The joint so formed is thus a good support point for conduit attached to the outer end of the starter piece.

Installation is simple. An approximately round hole is cut in plenum wall 14. The precise roundness of the hole is not critical, because insert 12 may distort somewhat to accommodate out of roundness. The starter piece is then inserted into the hole 21 in the manner described above, and the two parts are fastened together with sheet metal screws, after the holes for the screws have been drilled.

What is claimed is:

1. A plenum starter piece for attaching a generally cylindrical conduit to a generally planar plenum comprising:

a relatively short generally cylindrical sheet metal starter piece body having at one end an external annular flange fitting against a planar surface of said plenum;

means fastening the flange of said body to said plenum;

the other end of said starter piece body being proportioned for telescoping engagement with a section of said conduit;

and a generally cylindrical starter piece insert of sheet metal telescoped into the flanged end of said body and secured thereto;

said insert having an end projecting axially away from said body, said projecting end extending through and engaging the peripheral edge of a generally round hole in said plenum so as to at least partially seal off around the hole and between said plenum and insert.

* * * * *